United States Patent [19]

Maricle

[11] 4,129,683

[45] Dec. 12, 1978

[54] ANHYDROUS $H_2/Cl_2$ REGENERATIVE FUEL CELL

[75] Inventor: Donald L. Maricle, Glastonbury, Conn.

[73] Assignee: United Technologies Corp., Hartford, Conn.

[21] Appl. No.: 863,817

[22] Filed: Dec. 23, 1977

[51] Int. Cl.² ............................................... H01M 8/18
[52] U.S. Cl. ......................................... 429/21; 429/29; 429/46; 429/101
[58] Field of Search .................... 429/21, 29, 40, 41, 429/46, 67, 70, 199, 194, 196, 191, 103, 104, 101

[56] References Cited

U.S. PATENT DOCUMENTS

| | | | |
|---|---|---|---|
| 3,546,020 | 12/1970 | Berger | 429/40 X |
| 3,660,888 | 5/1972 | Epstein et al. | 429/103 X |
| 4,037,025 | 7/1977 | Dey et al. | 429/29 |

*Primary Examiner*—Charles F. Lefevour
*Attorney, Agent, or Firm*—Charles A. Warren

[57] ABSTRACT

A regenerative fuel cell in which the reactive gases are hydrogen and chlorine and the electrolyte is a conductive anhydrous solvent in which the chlorine gas and the hydrogen chloride gas are soluble, this electrolyte readily releasing the gaseous hydrogen chloride for storage during discharge of the cell.

8 Claims, 1 Drawing Figure

U.S. Patent          Dec. 12, 1978          4,129,683
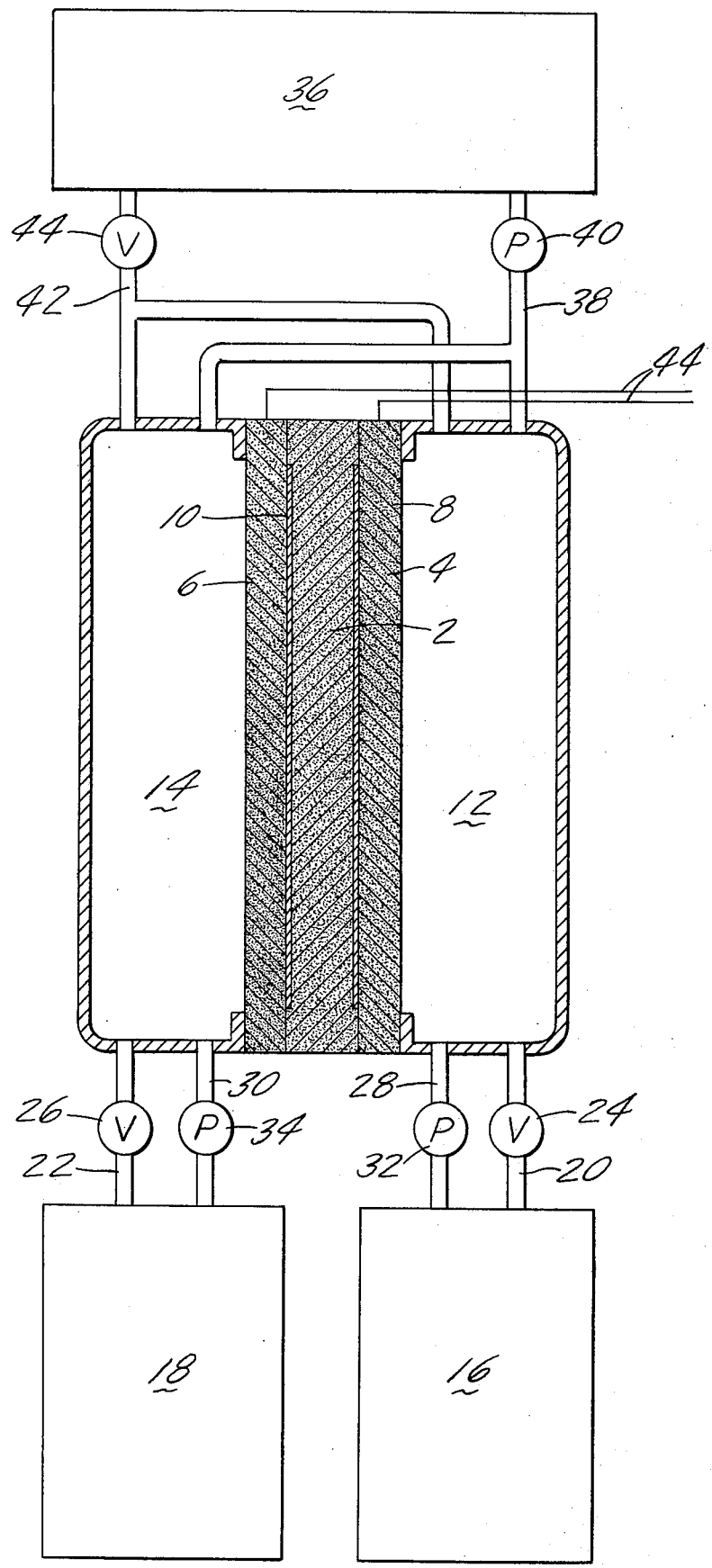

ANHYDROUS H₂/CL₂ REGENERATIVE FUEL CELL

BACKGROUND OF THE INVENTION

The copending application of D. Maricle, U.S. Ser. No. 863,816 filed — describes a regenerative cell utilizing an aqueous solution of hydrochloric acid or a chloride salt as the electrolyte in a hydrogen-chlorine fuel cell. Such a cell requires a storage space for the HCl or salt electrolyte in the discharged state, necessitating a pumped electrolyte system. Further, complete separation of gaseous hydrogen chloride from the aqueous electrolyte is difficult during discharge of the cell making it difficult to store this HCl in any form except in the aqueous electrolyte. In this form, it necessitates the use of materials for the storage tank that are resistant to the corrosive action. If this HCl is removed as a gas, and also when the chlorine is removed from the electrolyte as a gas during charging of the cell, these gases carry with them substantial wetness from the electrolyte. In this form, these gases are much more corrosive than when dry. The cell accessories thus require the use of materials resistant to these gases or the use of extensive drying techniques which are undesirable complications.

SUMMARY OF THE INVENTION

The principal feature of this invention is a hydrogen-chlorine regenerative cell utilizing an anhydrous electrolyte thereby avoiding the corrosive action of the chlorine gas and also the hydrogen chloride dissolved in or carrying moisture from the water of the electrolyte. Another feature is the use of an electrolyte in which both gaseous hydrogen, chlorine and hydrogen chloride gas are readily dissolved but from which they are readily evolved or evaporated by reason of the low vapor pressure. This evolution of the HCl from the electrolyte facilitates storage of HCl since it can be stored as a compressed gas.

According to this invention, the regenerative cell utilizes hydrogen and chlorine as the reactant gases, electrodes capable of functioning as reversible gas diffusion hydrogen and chlorine electrodes and as an electrolyte, an anhydrous inorganic or organic solvent or a molten salt having a low vapor pressure with respect to both chlorine and hydrogen chloride. If it is desirable to use as an electrolyte a solvent that is non-ionic, a conductive salt may be added to make the electrolyte conductive or the dissolved HCl may itself function as the conductive material in the electrolyte.

The foregoing and other objects, features, and advantages of the present invention will become more apparent in the light of the following detailed description of preferred embodiments thereof as illustrated in the accompanying drawing.

BRIEF DESCRIPTION OF THE DRAWING

The single FIGURE is a diagrammatic view of a fuel cell utilizing the invention. de

DESCRIPTION OF THE PREFERRED EMBODIMENT

The cell to which the invention is applicable is shown diagrammatically and only a single cell is shown. In the usual construction a stack of cells would be assembled to produce the desired voltage within the stack. The cell includes a matrix 2 which is porous and supports the electrolyte therein. This electrolyte is selected to be water-free. A preferred electrolyte is anhydrous phosphoric acid ($H_3PO_4$) or $H_2SO_4$, either of which dissolves the gaseous HCl, $Cl_2$ and $H_2$ to a sufficient extent to support the electrochemical reactions within the cell, from which the hydrogen chloride is readily separated during the discharge of the cell and from which the $H_2$ and $Cl_2$ are readily evolved during charge. Other electrolytes may be molten salts such as a mixture of $AlCl_3$, NaCl and KCl with a melting point of 70° F. or, less desirably, organic solvent such as propylene carbonate or inorganic solvents such as $POCl_3$.

On opposite sides of the matrix 2 are the electrodes 4 and 6 each of which is a gas diffusion electrode as for example compressed graphite fibers formed into a thin plate. One example is described in U.S. Pat. No. 3,972,735. Both electrodes may be the same material or it may be desirable to make the cathode, the chloride electrode, from a titanium screen, provided the density of the screen accomplishes the necessary results of a gas diffusion electrode.

On the face of the hydrogen electrode 4, the anode, is a catalyst layer 8 preferably supported platinum so applied as not to affect the porosity and the necessary functioning of the electrode. One example of this structure is described in U.S. Pat. No. 4,028,274. On the face of the chlorine electrode, the cathode, is a catalyst layer 10 in contact with the matrix. This catalyst is preferably ruthenium oxide so applied as not to affect the necessary functioning of the cathode as a gas diffusion electrode. As an alternative to the graphite electrode, the cathode maybe a titanium screen as above stated.

Against the electrodes on the sides opposite to the matrix are chambers 12 and 14, supplied with gas under pressure, hydrogen to chamber 12 and chlorine to chamber 14. These gases may be supplied from tanks 16 and 18 through conduits 20 and 22 to the respective chambers. These conduits may have pressure control valves 24 and 26 therein so that the gases in the chambers will be at the most favorable pressure when the cell is being discharged. Parallel conduits 28 and 30 may have pumps 32 and 34 for pumping the respective gases from the chamber under pressure into the tanks during charging or recharging of the cell.

The generated hydrogen chloride gas resulting from cell discharge is collected in a tank 36 connected by a branching conduit 38 to both chambers 12 and 14. A pump 40 may pump this gas into the tank under pressure. During recharging hydrogen chloride enters chambers 12 and 14 through another branching conduit 42 to be electrochemically broken up into hydrogen and chlorine which enter the respective chambers. A pressure control 44 may be provided in conduit 42.

In operation, during discharge, $H_2$ and $Cl_2$ enter the chambers 12 and 14, respectively, at one end of the chamber and pass through the respective electrodes into contact with the electrolyte in the catalyst areas. These gases combine electrochemically in the cell producing electricity and forming gaseous HCl that is dissolved temporarily in the electrolyte. As the quantity of dissolved HCl increases in the electrolyte by the cell discharge, some of this HCl is evolved from the electrolyte, migrates through the electrodes in a direction opposite to the movement of $H_2$ and $Cl_2$ and this evolved HCl then passes through the branching conduit 38 into the tank 36. Obviously, a small amount of $H_2$ and $Cl_2$ will become mixed with the HCl but this is not detrimental to the operation of the cell. Obviously, as shown, the conduit 38 connects to the chambers 12 and 14 at the ends remote from the conduits supplying the gaseous $H_2$ and $Cl_2$. The electricity produced is led off from the electrodes by leads 46.

During charge, electricity is supplied from a source through the leads 46 to the electrodes. HCl is now supplied through branch conduit 42 to the chambers and this gas flows through the electrodes to be dissolved in the electrolyte from which it is electrolyzed into $H_2$ and $Cl_2$ at the respective electrodes. These gases pass through the electrodes to the chambers and are collected in the respective tanks. The small amount of HCl that mixes with the $H_2$ and $Cl_2$ gases is not detrimental to the cell operation.

On charge, storage of both products is exothermic and the delivery of HCl to the cell is endothermic, so suitable heat exchangers or heat pumps may be essential to be successful operation. For optimum efficiency of the total cell, these exchangers and heat pumps will be interconnected for heat transfer between them to minimize heat loss. On discharge, the reverse is true so the heat exchangers and/or heat pumps would operate in the reverse direction to provide an appropriate heat balance.

The advantages of an anhydrous cell are many. One is that the volume of electrolyte is limited to that required to operate the fuel cell power section. Both the reactant gases and the product (gaseous HCl) can be pumped from the electrolysis cells and stored as gases or pure liquids rather than dissolved in aqueous solvents. Thus improves the gravimetric and volumetric energy density.

Another advantage is that with an anhydrous electrolyte there is no water to cause the gases to be wet and both chlorine and hydrogen chloride gases are much less corrosive when dry. Thus, there is no need to dry either of these gases when they are being stored in the tanks.

Although the gases may be stored as a gas it may be desirable to store both chlorine and HCl in liquified form rather than as gases, or the HCl may be stored by adsorption on a solid support material. Hydrogen may be stored cryogenically as a highly compressed gas or as a metal hydride such as $TiFeH_{1.6}$.

Obviously, in discharge, the fuel cell operates in the usual way. Gaseous hydrogen and gaseous chlorine entering the cell through the respective electrodes combine to form hydrogen chloride gas and in so doing the pairing molecules of the gases produce electricity. The electricity may be led from the cell by the usual electrical connections to the electrodes.

During charge, electricity entering the cell by way of the electrodes breaks the hydrogen chloride dissolved in the electrolyte into hydrogen and chlorine at the respective electrodes and these gases enter the respective chambers from which they are pumped for storage.

To minimize polarization of the chlorine electrode while avoiding excess self-discharge by migration of dissolved chlorine to the hydrogen electrode, it may be desirable to use in the electrolyte an additional chlorine salt by which to control the solubility of the chlorine gas in the electrolyte.

Although the invention has been shown and described with respect to a preferred embodiment thereof, it should be understood by those skilled in the art that other various changes and omissions in the form and detail thereof may be made therein without departing from the spirit and the scope of the invention.

Having thus described a typical embodiment of my invention, that which I claim as new and desire to secure by Letters Patent of the United States is:

1. A regenerative fuel cell including:
   a matrix;
   an electrode on each side of the matrix;
   container means external to the cell for separately containing hydrogen and chlorine;
   means connecting the container means to the cell for supplying the hydrogen and chlorine from the container means to the electrodes on the sides opposite the matrix;
   an anhydrous electrolyte in the matrix dissolves the reacting gas in the cell; and
   a tank external to the cell to receive hydrogen chloride gas evolved within the cell during discharge of the cell.

2. A cell as in claim 1 in which the electrolyte is anhydrous phosphoric acid.

3. A cell as in claim 1 in which the container means is a tank for each of the hydrogen and chlorine gases for storing these gases, a connection from each tank to the associated electrode, and a pressure control valve in each of said connections to supply the respective gas at a selected pressure to the electrode.

4. A cell as in claim 1 in which the container means is a tank for storing each of the hydrogen and chlorine gases, and pump means for pumping each of the gases from the cell to the tanks during charging of the cell.

5. A regenerative fuel cell capable of being charged or recharged after discharge including:
   opposed electrodes for the cell;
   a matrix between the electrodes;
   chambers on the sides of the electrodes opposite to the matrix;
   container means external to the cell for each of hydrogen and chlorine;
   means connecting the container means to the chambers for supplying the hydrogen and chlorine to said chambers, one gas to each electrode during discharge, and for receiving gas from said chambers during charge or recharge;
   an anhydrous electrolyte in the matrix; and
   a tank external to the cell and connected thereto to receive hydrogen chloride gas evolved in the cell during discharge.

6. A fuel cell as in claim 5 in which each electrode has a catalyst on the side facing the matrix, each electrode is porous for the passage of gas therethrough, and the electrolyte is an anhydrous material in which hydrogen chloride gas and the hydrogen and chlorine gases are readily absorbed and from which these gases are readily evolved.

7. A fuel cell as in claim 6 in which the connection from the tank for the hydrogen chloride to the cell includes pump means for removing hydrogen chloride gas from the electrolyte in the matrix to the tank during discharge of the cell and a pressure control valve for controlling the delivery pressure of this gas from the tank to the cell during charge of the cell.

8. A fuel cell as in claim 5 in which the electrolyte is anhydrous phosphoric acid.

* * * * *